United States Patent [19]

Mery et al.

[11] Patent Number: 4,606,436
[45] Date of Patent: Aug. 19, 1986

[54] THERMALLY PROTECTED SHIELD ASSEMBLY FOR MULTI-DISC BRAKES

[75] Inventors: Jean-Claude Mery, Pavillons sous Bois; Guy Meynier, Aulnay sous Bois, both of France

[73] Assignee: Societe Anonyme DBA, Paris, France

[21] Appl. No.: 622,915

[22] Filed: Jun. 21, 1984

[30] Foreign Application Priority Data

Jun. 30, 1983 [FR] France .................... 83-10919

[51] Int. Cl.$^4$ .................... F16D 55/224; F16D 65/847
[52] U.S. Cl. .................... 188/18 A; 188/71.4; 188/71.5; 188/264 G; 301/6 WB
[58] Field of Search .................... 188/18 A, 71.5, 71.6, 188/322.16, 322.17, 322.18, 264 G, 218 A, 71.4, 264 A, 264 AA; 301/6 CS, 6 WB; 192/113 A; 277/22, 212 F, 212 FB, 237 R, 237 A

[56] References Cited

U.S. PATENT DOCUMENTS 3,008,547 11/1961 Rockwell .................... 188/71.5

FOREIGN PATENT DOCUMENTS 2751887 5/1979 Fed. Rep. of Germany ... 188/18 A
2350510 12/1977 France .
57-12135 1/1982 Japan .................... 188/71.5
1087988 10/1967 United Kingdom .
1201438 8/1970 United Kingdom .

Primary Examiner—Bruce H. Stoner, Jr.
Assistant Examiner—Richard R. Diefendorf
Attorney, Agent, or Firm—Ronald D. Welch; Ken C. Decker

[57] ABSTRACT

The invention relates to a multi-disc brake comprising a stationary rotary disc (1) and a moveable rotary disc (2) which is mounted on a splined sleeve (5) sliding on a splined part (3a) of a hub (3) of axis (4) and with which the disc (1) is solid. An assembly of friction pads (6 to 9) can interact with the discs (1,2) under the action of a hydraulic jack (13). The splines (23,25) of the hub and of the sleeve are protected from dirt by deformable diaphragms (20,26) which are turned in on themselves and which are arranged so as to be shielded from the thermal radiation emitted by the braking members (1,2,6 to 9).

8 Claims, 2 Drawing Figures

THERMALLY PROTECTED SHIELD ASSEMBLY FOR MULTI-DISC BRAKES

The invention relates to a multi-disc brake comprising a first rotary disc fixed to a hub and a second rotary disc mounted on the hub for sliding movement parallel to the direction of the axis of the latter, the axes of the hub and of the said discs coinciding with one another, and further including an assembly of friction pads incorporating friction linings capable of being laid against the faces of the discs by means of an actuating device, such as a hydraulic caliper jack; the second disc is carried by an internally splined sleeve which can slide on an externally splined part of the hub, the mutual engagement of these splines ensuring that the second disc is driven in rotation by the hub; the sliding sleeve is connected to the hub on either side of the fastening region of the second disc by means of deformable diaphragm seals of general cylindrical shape.

The purpose of these diaphragm seals is to prevent dirt from penetrating into the region of the splines of the hub and sliding sleeve, thereby risking causing the latter to lock. When they are made in the form of cylindrical bellows covering the sleeve up to the region where the second disc is fastened to the latter, they are exposed to the heat emitted during the braking cycles by the discs and the associated linings. Since the temperature of these elements is capable of rising to 800° or 900° C., it will be appreciated that this arrangement can result in a reduction in the service life or even the destruction of the bellows seals which are usually made of rubber.

To avoid this disadvantage, it is proposed, according to the invention, to arrange the said diaphragm seals at least partially within protective annular metal surfaces surrounding coaxially zones of the part of the hub on which the sleeve slides. These protective metal surfaces which are preferably fixed to the hub, shield the diaphragm seals from the harmful thermal influence of the braking means.

When there are portions of diaphragm seals which are not surrounded by the said protective surfaces, it is appropriate to surround these portions with additional protective rings which are centred on the axis of the hub and at least one of which can be fixed to the sliding sleeve.

It becomes easier to put the arrangement described into practice if the diaphragm seals are attached to the sleeve not at the foot of the elements fastening the second disc to the sleeve, but to the respective ends of the sleeve.

In a preferred embodiment, the diaphragm seals are flexible sheaths which are turned in on themselves and which follow the displacements of the sleeve relative to the hub by unfolding to a greater or lesser extent. These sheaths can be attached to the hub and sleeve respectively by means of edge beads which they incorporate and which are retained on the hub or on the sleeve by fastening rings.

Other characteristics and advantages of the invention will emerge more clearly from the following description of a non-limiting exemplary embodiment with reference to the attached drawings.

Figure 1:
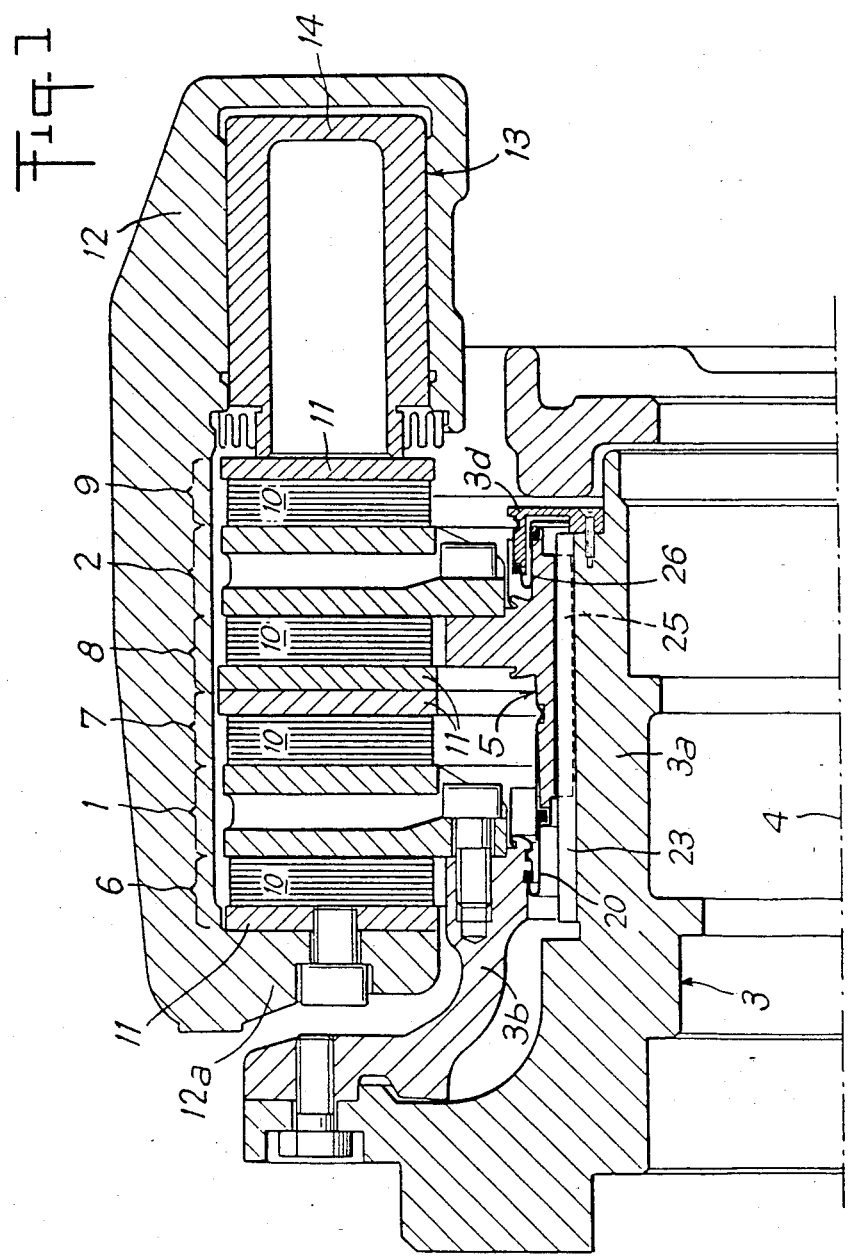
FIG. 1 shows, in axial section, a disc brake designed according to the invention.
Figure 2:
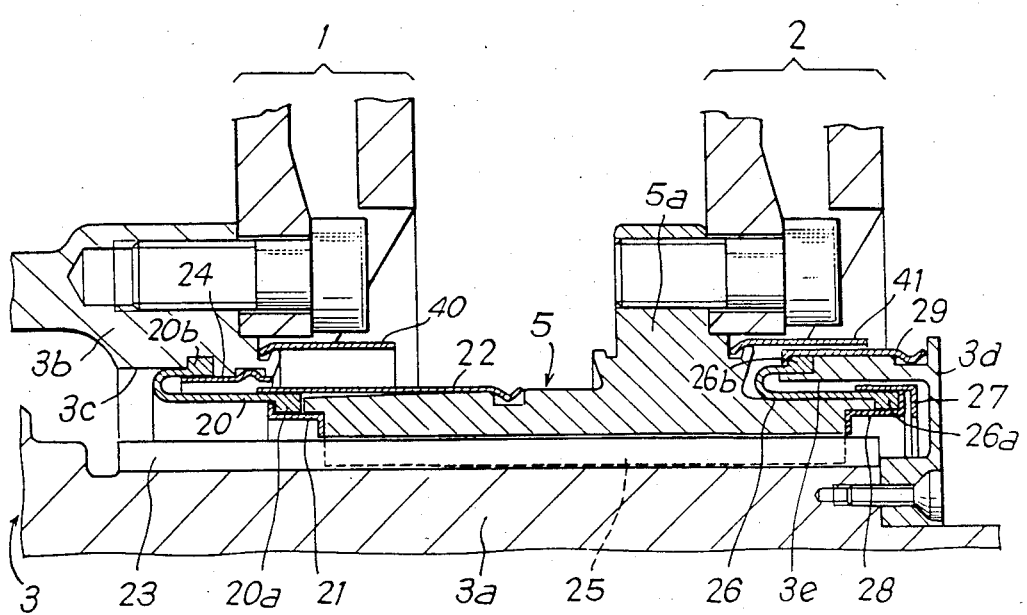
FIG. 2 shows, on a larger scale, the central part of the article illustrated in FIG. 1.

The multi-disc brake shown in FIG. 1, comprises a first rotary disc 1, called an outer disc, and a second rotary disc 2, called an inner disc, both being mounted on a metal hub 3, the axis 4 of which coincides with those of the discs 1 and 2. While the disc 1 is solid with the hub 3 and therefore fixed in the direction of the axis 4, the disc 2 can be displaced in this direction, being fastened to an internally splined sleeve 5 which can slide on a splined cylindrical part 3a of the hub 3, round which it is engaged. The sleeve is driven in rotation by the hub as a result of the engagement of its splines 25 with the splines 23 of the hub 3.

Each brake disc 1 or 2 interacts with a pair of friction pads 6 and 7 or 8 and 9 arranged on either side of the corresponding brake disc 1 or 2 and capable of being applied against the lateral faces of the latter. Each of these friction pads 6,7,8,9 comprises a friction lining 10 and a lining-holding plate 11, each lining 10 interacting with the adjacent face of the corresponding disc 1 or 2.

A caliper 12 is located above the brake discs 1,2 and their friction pads 6,7,8 and 9 so as to cover the assembly consisting of the discs and pads. In the part of the caliper 12 located on the same side as the inner disc 2 there is a control motor, such as a hydraulic jack 13, the piston 14 of which is capable of acting on the lining-holding plate 11 of the inner pad 9 and, as a result of reaction and because of its bent nose 12a, on the lining-holding plate 11 of the outer pad 6, so as to control the clamping of the assembly consisting of the discs and pads in the direction of the axis 4 and thus give rise to a braking friction between each lining 10 and the matching disc face. This action is accompanied by a displacement of the inner disc 2 parallel to the axis 4 as a result of the sliding of the sleeve 5 on the part 3a of the hub 3, the splines of which must be protected from dirt which could soil them.

For this purpose, the left-hand end (according to the representation in the Figures) of the sleeve 5 is connected in a sealed manner to the adjacent part 3b of the hub 3, to which the outer disc 1 is fastened, by means of a flexible sheath or "sock" 20 turned in on itself. This sheath is attached, by one of its edges provided with a circular bead 20a to the entire periphery of the end of the sleeve 5 by means of sheet-metal rings 21 and 22 engaged on the sleeve 5 and retaining the said bead 20a between them. The other edge of the sheath is attached by means of its bead 20b, similar to the bead 20a, to the entire periphery of the part 3b of the hub 3 which serves as a support for the disc 1. This part has an annular surface 3c which partially surrounds the sheath 20 and which is located opposite and at a distance from the corresponding end of the splines 23 of the part 3a, and the second bead 20b of the sheath 20 is retained by means of a sheet-metal ring 24 in a circular groove which this annular surface possesses.

At the other end of the sliding sleeve 5 there is likewise a sheath 26 turned in on itself and connecting this end in a sealed manner over its entire periphery to an adjacent part of the hub 3 which consists of a collar 3d surrounding the said end of the sleeve 5, leaving an annular gap, in which a portion of the sheath 26 is accommodated, within the surface 3e of the collar 3d. The sheath 26 is attached to the sleeve 5 by means of a bead 26a retained between sheet-metal rings 27 and 28 engaged on the sleeve and is attached to the hub 3 by means of a bead 26b retained in a circular groove of the part 3d by a sheet-metal ring 29 engaged on the said part.

The sheath seal 20 is shielded from the thermal radiation which the discs 1,2 and the brake linings 10 can emit, because it is located within the part 3b of the hub 3 and as a result of the additional screen effect provided by a sheet-metal ring 40 surrounding the ring 12 in line with the disc 1 and fastened to the part 3b, with a free gap being left relative to the ring 22.

The sheath seal 26 is likewise shielded from the thermal radiation emitted by the discs and brake linings, because it is arranged within the surface 3e of the part 3d of the hub 3 and as a result of the additional screen effect provided by a sheet-metal ring 41 surrounding the ring 29 in line with the disc 2 and fastened to the part 5a of the sleeve 5 which supports the disc 2, with a free gap being left in relation to the ring 29.

Because of the structure of the multi-disc brake chosen as an example in this description, the diaphragm 20 located on the outside is arranged in the extension of the sleeve 5, while the diaphragm 26 located on the inside extends over the corresponding end of the sleeve 5 which it covers. Of course, depending on the circumstances encountered in practice, each of the two diaphragm seals used can have the arrangement of the diaphragm 20 or that of the diaphragm 26 of the present example.

We claim:

1. A multi-disc brake comprising a first rotary disc fixedly secured to a hub and a second rotary disc mounted on a splined portion of the hub for sliding movement parallel to the axis of the latter, the axis of the hub and of the said discs coinciding with one another, and an assembly of friction pads incorporating friction linings frictionally engageable with the faces of the discs, actuating means for effecting frictional engagement between said discs and friction linings, said second disc including an internally splined sleeve slidable on and drivingly engaged with said splined portion of said hub, said internally splined sleeve being connected to the hub on both sides of the second disc by means of deformable diaphragm seals of generally cylindrical shape, characterized in that said deformable diaphragm seals are disposed at least partially within protective annular metal surfaces forming a part of said hub and coaxially surrounding portions of the splined portion of the hub on which said sleeve slides.

2. A brake according to claim 1, characterized in that the protective metal surfaces (3c, 3e) are integral portions of said hub (3).

3. A brake according to claim 1 further including protective rings (40, 41) centered on the axis (4) of the hub (3), the portions of the diaphragm seals (20, 26) outside the annular surfaces (3c, 3e) being surrounded by said protective rings.

4. A brake according to claim 3, characterized in that at least one of the protective rings (40, 41) is fixed to the hub (3).

5. A brake according to claim 3 characterized in that at least one of the protective rings (40, 41) is fixed to the sliding sleeve (5).

6. A brake according to claim 1, characterized in that the diaphragm seals (20, 26) are attached to the sliding sleeve (5) at the ends of the latter.

7. A brake according to claim 1, characterized in that the diaphragm seals are flexible sheaths (20, 26) turned in on themselves.

8. A brake according to claim 7, characterized in that the sheaths (20, 26) are attached respectively to the hub (3) and to the sleeve (5) by means of edge beads (20a, 20b, 26a, 26b) retained on the hub and on the sleeve by fastening rings (21, 22, 27, 28).

* * * * *